(12) United States Patent
Schilling et al.

(10) Patent No.: US 7,248,761 B2
(45) Date of Patent: Jul. 24, 2007

(54) OPTICAL ROTATING DATA TRANSMISSION DEVICE WITH COUPLING SLIDE

(75) Inventors: Harry Schilling, Eichstaett (DE); Guenther Schoppel, Weisendorf (DE); Matthias Rank, Wilmering (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 11/352,979

(22) Filed: Feb. 10, 2006

(65) Prior Publication Data
US 2006/0193555 A1 Aug. 31, 2006

Related U.S. Application Data

(63) Continuation of application No. PCT/EP2004/008834, filed on Aug. 6, 2004.

(30) Foreign Application Priority Data
Aug. 7, 2003 (DE) ................ 103 36 925

(51) Int. Cl.
*G02B 6/26* (2006.01)
(52) U.S. Cl. .................. 385/25; 385/4; 385/9; 385/26
(58) Field of Classification Search ............. 385/25–26
See application file for complete search history.

(56) References Cited

U.S. PATENT DOCUMENTS

| | | |
|---|---|---|
| 4,109,997 A | 8/1978 | Iverson |
| 4,525,025 A | 6/1985 | Hohmann et al. |
| 4,555,631 A | 11/1985 | Martens |
| 4,934,783 A | 6/1990 | Jacobson |
| 4,962,986 A | 10/1990 | Hompel et al. |
| 5,121,419 A | 6/1992 | Micheron et al. |
| 5,229,871 A | 7/1993 | Czarnek et al. |
| 6,104,849 A | 8/2000 | Lewis et al. |
| 2004/0037488 A1* | 2/2004 | Guidotti et al. ............... 385/16 |

FOREIGN PATENT DOCUMENTS

DE 19543386 3/1997

OTHER PUBLICATIONS

International Search Report, PCT/EP2004/008834 mailed Dec. 29, 2004.
Integrated Optics, edited by T. Tamir, © 1979 Springer-Verlag, p. 87.

* cited by examiner

*Primary Examiner*—Michelle Connelly-Cushwa
*Assistant Examiner*—Eric Wong
(74) *Attorney, Agent, or Firm*—Kevin L. Daffer; Daffer McDaniel, LLP

(57) ABSTRACT

A device for transmitting modulated optical signals between a first unit and a second unit, in which the first unit is supported to be rotatable or movable linearly relative to the second unit, comprises a light guide extending along a given track on the first unit, a first light coupler for coupling light into and out of the light guide, and a second light coupler disposed on the second unit and movable relative to the light guide for coupling light into and out of the light guide. A coupling slide is provided for supporting the second light coupler, and is mechanically loosely connected to the second unit via a take-up unit so that the coupling slide is moved along the given track together with the second unit by a movement of the second unit.

59 Claims, 15 Drawing Sheets

OPTICAL ROTATING DATA TRANSMISSION DEVICE WITH COUPLING SLIDE

CROSS REFERENCE TO RELATED APPLICATIONS

This application is a continuation of pending International Application No. PCT/EP2004/008834 filed Aug. 6, 2004, which designates the United States and claims priority from pending German Application No. 103 36 925.2 filed Aug. 7, 2003

BACKGROUND OF THE INVENTION

1. Field of the Invention

The invention relates to a device for transmitting optical signals between units that are rotatable relative to each other. Devices of this kind are used preferably in computer tomographs.

2. Description of the Prior Art

Various devices are known for transmitting optical signals between units that are rotatable relative to each other, particularly those having an unobstructed inner diameter. A basic problem existing here is that of designing a means for carrying light along the circumference of the device, and also suitable means for coupling light in and out. For use in computer tomographs, devices of this kind must have large unobstructed diameters of an order of magnitude of 1 meter. The circumferential speed of a rotation may be of an order of magnitude of 20 m/s. At the same time, data rates of more than 1 gigabit per second (Gbaud) must be feasible.

Thus, U.S. Pat. No. 4,109,997 discloses an optical rotating data transmission device in which travel of light along the circumference occurs by reflection at two opposite faces. Light guides or glass fibers are provided for coupling light in or out, a bundling or focusing of the light beam being effected by means of lenses. However, this device is attended by a whole series of disadvantages. Thus the optical attenuation of transmission is relatively high, owing to multiple reflections at relatively steep angles. Therefore, an optical transmitter is required to have high transmission power. Furthermore, the costs of fabrication are relatively high, owing to the confronting mirror-coated surfaces. Wideband data transmission with modulation-signal period-lengths which are substantially smaller than the transit time of the light around the circumference of the device is not possible, because a multiple-path reception of signals occurs at receiver positions close to a transmitter. Thus, signals received from the transmitter along a short path, and signals which have been reflected at least once around the circumference of the device, are received simultaneously. The transit time difference must be small in comparison with the period length of the modulation signal. Thus, with an inner diameter of about 1 meter, a total transit time around the circumference of about 10 nanoseconds results. For example, in a transmission of digital signals this makes it possible to achieve bit periods of maximally 50 nanoseconds, corresponding to a maximum transmission rate of 20 Mbaud.

An improvement of the optical system is disclosed in U.S. Pat. No. 4,525,025. This illustrates, particularly in FIG. 10, a specially suitable trench for transmitting optical signals. It consists only of one component part, and can therefore be manufactured at favorable cost. However, also this patent specification describes no effective solution of the problem of bandwidth limitation. In addition, the proposed coupling-in or coupling-out of light by blunt fiber ends can be achieved only with an extremely poor efficiency. Therefore, this device is suitable only for small diameters.

An improvement of optical coupling-in or coupling-out is disclosed in U.S. Pat. No. 4,555,631. In this, the coupling-in of optical signals into a mirror-finished cylinder is effected by means of two mirrors. For coupling-out, an additional coupling-out element is provided to be disposed at a fixed position in the trench. However, here too a large attenuation of the optical transmission path results, because the coupling-in mirrors cannot be placed arbitrarily close to the mirror-finished cylinder, in particular at high speeds of movement. Moreover, an unavoidable fanning of the light beam on the plane mirror surface results in an additional deterioration of efficiency. Furthermore, the mechanical construction of the coupling-out element involves much outlay, and is therefore liable to failure, and costly. Finally, the problem of bandwidth limitation is not solved. Thus, the light is conducted from a coupling-in position to a coupling-out position along two paths in opposite directions, and finally jointly evaluated in a receiver. Here too, the limitation applies that the period length of the modulation signal must be substantially smaller than the transit time of the light around the circumference of the device.

A device having an especially high optical efficiency is described in U.S. Pat. No. 4,934,783. In this, a focusing of the beam of rays is effected through a lens system. However, this system involves much outlay, is expensive to fabricate, and is suitable only for small diameters. Furthermore, here too the wideband problem has not been solved.

In order to reduce the attenuation along the transmission path, and to increase the bandwidth capable of being transmitted, U.S. Pat. No. 6,104,849 proposes a transmission along a plurality of shortened segments. A reduced attenuation results from the shortened segments. Here the maximum bandwidth is inversely proportional to the length of the segments. Therefore a larger bandwidth can be achieved with shorter segments. However, for this a correspondingly larger number of optical transmitters or receivers is needed to cover the entire circular circumference. Thus, the system costs rise in proportion to the band width.

DE 195 43 386 C1 describes a wideband signal transmission device which makes possible a large bandwidth, but gives no indication of transmission with high transmission quality.

U.S. Pat. No. 4,962,986 describes an alternative device for coupling light. For coupling light into and out of light-guiding fibers, a coupling medium having a higher refractive index than the surroundings is directly contacted with a fiber core. With this, a deflection of the light carried in the fiber into the coupling medium is effected. This arrangement has the decisive disadvantage that the coupling medium must directly contact the fiber core. Therefore this system is adapted for use almost exclusively for coupling at given fixed locations. A system of this kind is, however, hardly applicable to arrangements in which a transmitter and a receiver move relative to each other, because here the coupling medium must move at a high speed along a usually very thin and sensitive fiber core.

A device of this kind is described by Tamir, "Integrated Optics," published by Springer Verlag, Berlin, 1979, page 87. In this, a prism serving for coupling-out is positioned at as small as possible a distance above the fiber core. In order to obtain a reasonable coupling efficiency here, the distance between the prism and the fiber core must be of the order of magnitude of a light wavelength. However, with conventional highly precise bearing means, this accuracy can be achieved only with small dimensions of the entire arrangement. Therefore at present this system cannot be used, for example in computer tomographs having a diameter of 1.5 meters and circumferential speeds of up to 20 m/s.

SUMMARY OF THE INVENTION

The invention is based on the object of designing a relatively low-cost device for transmitting optical signals between two units that are rotatable relative to each other so that reliable transmission becomes possible with low optical attenuation for large diameters, high mechanical speeds of movement, and high data rates. Furthermore, it is the object of a special embodiment of the invention to design the device so that even signals having period durations that are small by comparison with the time of propagation of light around the circumference of the device may be transmitted.

In accordance with the invention, this object is achieved by a device for transmitting modulated optical signals between a first unit and a second unit, in which the second unit is supported to be rotatable or linearly movable relative to the first unit, comprising: a light guide extending along a given circular or linear track of a predetermined length on the first unit; at least one first light coupler connected to the light guide for coupling light into or out of the light guide; and at least one second light coupler disposed on the second unit and movable along the circular or linear track relative to the light guide, for coupling light into and out of the light guide; and further comprising: a coupling slide of a short length compared with the predetermined length of the given track, for supporting the second light coupler; a guide means disposed along the track for guiding the coupling slide; a take-up unit connecting the coupling slide with the second unit to move the coupling slide in a direction of movement of the second unit by a movement of the second unit.

BRIEF DESCRIPTION OF THE DRAWINGS

In the following the invention will be described by way of example, without limitation of the general inventive concept, on examples of embodiment with reference to the drawings FIG. 1 schematically shows in a general form a device according to the invention.

DETAILED DESCRIPTION OF THE INVENTION

Figure 1:
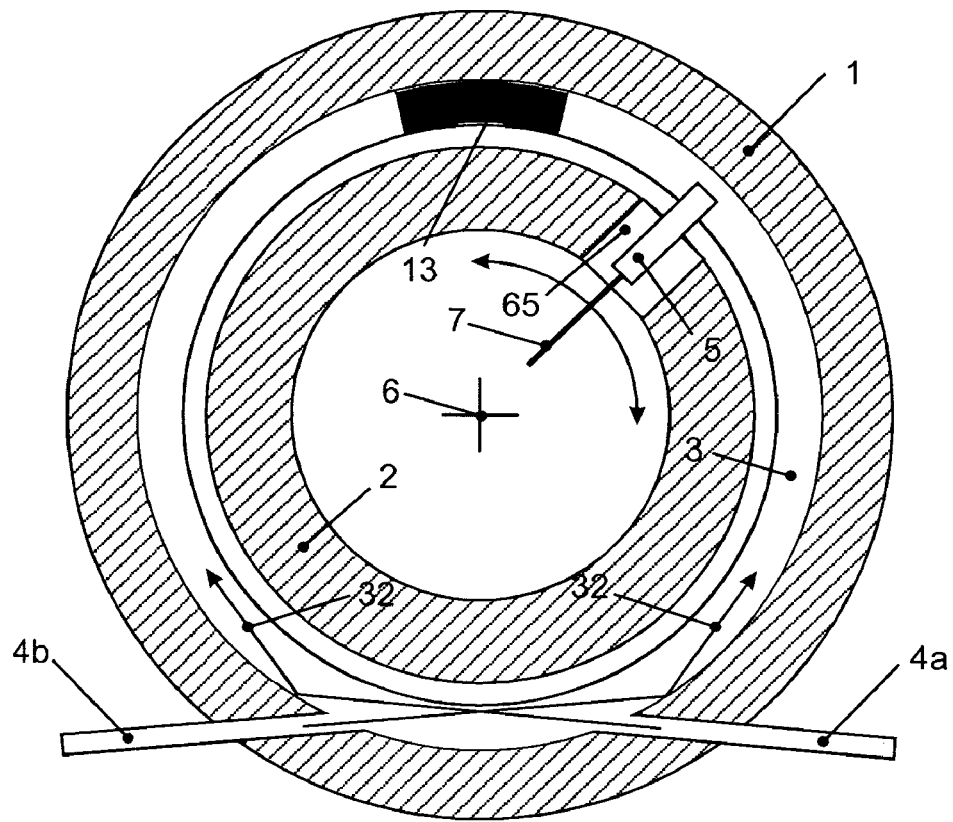

The device in accordance with the invention comprises a light guide that is disposed along a given track, preferably a circular track, on a first unit. For the sake of simplicity, only one light guide will be described here. Of course, a plurality of arrangements in accordance with the invention, each having one light guide, may be connected in parallel. Connected to the light guide is at least one first light coupler for coupling light into or out of the light guide. At least one optical transmitter or receiver is connected to at least one of these first light couplers. Whether a transmitter or receiver is to be connected to the light guide is determined by the desired direction of transmission. If light is to be transmitted away from the light guide, then a transmitter must be provided, and a receiver in the other case. Of course, for transmitting information, the optical transmitters are adapted to be modulated with a modulation signal.

Furthermore, a second unit is provided that is supported to be rotatable with respect to the first unit. A basic concept applied here is that of relative movement of the two units with respect to each other, and no reference will be made to rotating or stationary units, because this is exclusively a question of reference to location. To this second unit is assigned at least one second light coupler that moves, together with a rotation of the second unit relative to the first, along a predetermined track relative to the light guide. At least one of these second light couplers is equipped in a manner complementary to that of the first light guide, optionally with an optical transmitter or receiver.

The invention provides for at least one second light coupler to be disposed on a coupling slide for guiding the light coupler. The coupling slide is short by comparison with the given track, i.e. the circumference of a circular track, for example. Thus in this case the coupling slide comprises only a short circle segment or a short straight piece. Contrary to this, according to prior art the light couplers are disposed on the second unit itself. The coupling slide according to the invention is joined to the second unit itself only loosely by means of a take-up unit. In order to guide the coupling slide, and with it the light coupler connected thereto, exactly along the light guide, a guide means is provided which is disposed close to the light guide, preferably in the immediate vicinity of the light guide. The coupling slide is thus retained in a defined position with respect to the light guide by the guide means.

The movement along the light guide is effected by the second unit via the take-up unit. A substantial advantage of this embodiment is the large reduction of cost, because now only the coupling slide itself need be fabricated with high precision. For the fabrication and the mechanical bearing assembly of the entire second unit, substantially larger tolerances are admissible. An only loose mechanical coupling between the coupling slide and the second unit is effected by the take-up unit. This loose coupling makes possible at least a small degree of freedom (play) along at least one axis. This does not cause the accuracy of positioning of the coupling slide to be impaired by the second unit.

Owing to these particularly short or small structural shapes of the coupling slides, the invention is also usable with circular segments and also tracks of any desired diameter, and of course also with straight tracks.

Another kind of the invention provides hydrostatic or hydrodynamic, and aerostatic or aerodynamic bearing means for a coupling slide. In the following, a distinction will no longer be made between hydrostatic and aerostatic, and hydrodynamic and aerodynamic—although these are based on different media. Here at least one coupling slide is positioned with respect to the light guide along one or two axes by means of a hydrostatic or hydrodynamic bearing.

Hydrostatic or hydrodynamic bearings of this kind are based on a thin gas film or liquid film, preferably an air film between two plane surfaces. The film is of high stiffness, so that large changes of force lead to only minor changes of spacing.

In the case of a gas film, preferably an inert gas such as, for example, nitrogen or preferably a noble gas is used. The film-forming material or the gas is preferably transparent or non-absorbing at the wavelength used for optical transmission. With this, a penetration of the medium into the light guide causes no interference with transmission. Similarly, the medium may be directed into the light guide on purpose, for example to keep it free from external contamination, or to clean it.

Further suitable media are also liquids that pass over into a gaseous state at the operating temperature of the device. This makes possible a simultaneous cooling of the system, particularly under difficult conditions.

In the case of a hydrostatic bearing means, the supply of the medium to the bearing is effected preferably by means of a small pump or a pressure vessel. Here the medium is urged in between the two plane bearing faces. As such bearings use only smallest gas or air quantities because of the small spacing and the high surface quality of the bearing faces, a supply of this kind can be effected with low-cost means.

As an alternative to this, in the case of a hydrodynamic bearing means the supply can be effected using the air stream caused by the movement of the two units relative to each other. In this case, the bearing action is effected by the streaming (hydrodynamic paradox, Bernoulli effect). For this, means are preferably provided for conducting an air current caused by the movement between the bearing faces. In the simplest case, air guiding elements consist of a simple air guide sheet for suitably redirecting a part of the air currents. Similarly, more complex embodiments can be conceived, which for example contain additional filters in order to free the air steam from particles that are large, or small but troublesome. Optionally, arrangements can also be used which, for example, provide for an air velocity that is substantially independent of the speed of the movement.

Thus, an independence of the air streaming velocity with increasing speed of movement can be achieved by means of an element which provides for an increasing turbulence of air. A bearing means of this kind must, of course, have emergency running properties for the case of low speeds. These may be achieved, for example by additional combination with a hydrostatic design.

In another embodiment of the invention, the hydrostatic bearing means is supplied with an oscillating air current. A continuous air current normally used for bearings of this kind is usually generated by piston pumps. Valves are needed in these pumps in order to generate a continuous air stream from the pulsating movement. These valves increase the costs of manufacture and are in need of maintenance. A simple piston pump without valves generates an oscillating air stream, air being drawn in during a part of a movement, and air being blown out during another part of the movement, so that the time average of the conveyed quantity of air is equal to zero. For a hydrostatic bearing means the direction of the air stream is of no consequence. Thus, the effect of the bearing action is maintained during both directions of streaming. The short intervals of time during which the piston of the pump is at the upper or lower dead center, and consequently no streaming of air occurs, do not result in any breakdown of the bearing function, because of the inertial mass of the coupling slide. A particularly low-cost solution is obtained with this embodiment.

In another advantageous embodiment of the invention a coupling slide is supported optionally by means of ball bearings or slide bearings. These bearings may also be combined with hydrostatic or hydrodynamic bearings, for example to achieve better emergency running properties.

Another advantageous embodiment of the invention is provided with an active bearing regulating unit. This bearing regulating unit comprises an actuator for exactly positioning the light coupler, and also a sensor for determining the position of the light coupler with respect to the light guide, and a control unit for evaluating the sensor signals and the corresponding control of the actuator. The regulation of the bearing of the light coupler is effected along at least one axis, but preferably along two axes that are perpendicular to the tangent to the rotating movement. With this, optionally the height of the light coupler above the light guide, or the lateral distance between the light coupler and the light guide is maintained at a constant value. By means of this bearing regulation it becomes possible for the first time to couple in light at extremely flat angles, i.e. closely parallel to the tangent to the light guide, in order to make possible a quasi-parallel propagation of the light to the mirror trench in a so-called "whispering gallery mode". Optionally the bearing regulation may also comprise a rotational or tilting axis. Thus, in particular, an alignment of the coupled-in light ray parallel to the tangent of the light guide has an extremely large effect on the attenuation of coupling. The smallest of deviations from the parallelism of the axes of the light guide and light coupler can already lead to an interruption of a signal, when the light coupler has no means for lateral reflection. In such a case a regulation of the parallelism is of particular advantage. A bearing regulation of this kind is necessary, particularly with large diameters of the two units that are rotatable relative to each other, as used in practice, for example in computer tomographs, in order to counterbalance mechanical fabrication tolerances, and also tolerances of the mechanical movement. A substantially constant path attenuation can be achieved by means of this bearing regulation. As an alternative or in addition to this, a regulation may be provided for achieving a constant amplitude of a received signal. Thus, for example, a positioning along the lateral direction onto the center of the light guide may be achieved with a first control circuit. A second control circuit would then perform a positioning along the direction of height according to the received signal amplitude, whilst additional safety monitoring would prevent a collision between the light coupler and the light guide. For determining position, a reference track scanned by the sensor may be provided.

Instead of an electric actuator, for example a magnetic or piezoelectric actuator, other actuators, for example pneumatic or hydraulic actuators are conceivable. Similarly, sensors or elements of the control circuit may be designed to be pneumatic or hydraulic, in addition to being also designed to be electric. Optionally, the actuator may be designed to be at the same time an electromagnetic suspension of a second light coupler.

Particularly advantageous is a combination of a hydrodynamic or hydrostatic bearing means together with an active position regulation. They may be used, for example, along the same axis for particularly precise alignment, or also in supplementary manner along different axes. Thus, for example, the position regulation may be effected by control of air stream or air pressure of a hydrodynamic or hydrostatic bearing means. This combination yields, on the one hand, a mechanically robust system, and this is provided with highly precise characteristics by an additional, superposed regulation. With this, in particular, even tolerances of the spacing of an air-bearing means, caused by temperature and humidity fluctuations of the air, and also fluctuations of the velocity, may be counterbalanced.

In another advantageous embodiment of the invention, the sensor is designed to be optionally an optical, capacitive, or inductive sensor. For this, the sensor is preferably designed to be a differential sensor for evaluating the difference between two signals. In the case of an optical sensor this may be designed, for example, to measure the size of an image of a light source having at the focus corresponding to the optimal distance, a minimum size. Methods of this kind are used, for example, for focusing in CD players.

Another advantageous embodiment of the invention provides a light guide that is divided into at least two segments, means being provided for optical isolation of the segments from each other. An optical isolation can be achieved, for example, with absorbing materials between the segments, by deflection of light between the segments, for example with mirrors, gratings or scattering materials, or also by a separation of the directions of the optical signals.

In addition, the lengths of the segments, and also the directions of propagation of the light along the segments, are dimensioned so that at the boundaries between any two segments in which the same signal is transmitted, the modulation signal has only minor differences of transit time or phase. These differences should be small in comparison with a duration of the period of the modulation signal. Thus, the entire signal transit time of the signal from the optical transmitter to the optical receiver has only minor differences at the boundaries of the segments. This is necessary in order to ensure broadband signal transmission. For an interference-free transmission to be possible within the entire rotation range of 360°, the above stated conditions must apply to all connecting positions between any two adjacent segments.

Of course with a device according to the invention, a plurality of signals can also be transmitted simultaneously. It is only necessary for the above-condition to be satisfied for each one of these signals. The relationship between different signals may be arbitrary.

In another advantageous embodiment of the invention, groups of two adjacent light guides at a time are provided, which are of equal length and have opposite directions of propagation of the light. In the simplest case, the entire arrangement, as described above, comprises only one single group of this kind. Similarly, however, a plurality of groups of this kind may be disposed along the course of the track or the circumference of the circle. These may also each have different segment lengths, as long as both segments of one group are of the same length. Thus, for example, for reasons of construction different segment lengths may be provided to simplify the attachment. The division into a plurality of segments also offers the advantage that data may be transmitted in each segment independently from adjacent segments. This means that a correspondingly higher total data rate can be achieved. If, for example, an arrangement of four groups is provided along the entire track length or the circumference of the circle, then the entire data rate may be multiplied by means of a simultaneous transmission of four signals.

For this, the light guide is advantageously divided into an even number of segments. Because of the even number of segments, the arrangement may be put into practice particularly easily. A particularly low-cost embodiment is obtained with two segments. In order to attain a constant transit time at the segment boundaries with two segments, these must have the same length and also opposite directions of propagation of the light. In the case of two segments, a means for optical isolation is disposed at a position at 180° opposite to the coupling-in location. This means, in the case of light being coupled into the first unit, that an absorber is disposed to be displaced by 180° about the rotation axis of the two units. With a coupling of light into the second unit (and transmission from there to the first unit), a means for optical isolation is used that follows the rotary movement of the second unit relative to the mirror trench. This means for optical isolation also may be maintained in a desired position, for example by a position regulation, or a hydrostatic or hydrodynamic bearing means, as has been described for the coupling slide.

In another advantageous embodiment of the invention, at most one means for optical isolation is designed to be absorbing, or diffusely scattering to conduct light out of the light guide. For example, a monitoring receiver for monitoring the amplitude of the transmitted signal can be positioned at a poorly reflecting coupling-out position of this kind. Preferably this is designed to be a thin sheet.

In another advantageous embodiment of the invention, at least one means for optical isolation is designed to be wavelength-selective. With this, an optical isolation may be achieved for only certain wavelengths. This makes possible, for example, a simultaneous transmission of a plurality of channels having different wavelengths.

In another advantageous embodiment of the invention, at least one second light coupler comprising a light-guiding fiber is provided. The end of this fiber has a face serving to laterally deflect the light carried in the light-guiding fiber. By a deflection at this face, the light can now be deflected at an angle at which it can be carried further within the fiber. Owing to the reciprocity of the optical system, a coupling-in of light carried in the light guide into the optical fiber is of course also possible with this embodiment. For further optimization, optionally the fiber may be conformed to the contour of the light guide. Thereby a coupling-in of light can occur at a light guide face that is as large as possible. For deflecting the light, the face may be designed for deflection using total reflection caused by different refractive indices, and also similarly it may be mirror coated or comprise a diffraction grating.

Another advantageous embodiment of the invention consists in the light-guiding fiber being disposed to be approximately perpendicular to the tangent of the light guide. Furthermore, the angle of reflection of emerging light extends in advantageous manner nearly tangentially to the light guide.

Furthermore, the light-guiding fiber may at the same time be used as an optical sensor. For this, preferably further faces are provided for deflecting the sensor signals in the direction of the contour of the light guide. Because of this incorporation, the number of components needed can be reduced. Furthermore, mechanical adjustment is simplified, because a complicated precise adjustment of two components with respect to each other becomes unnecessary.

In another embodiment, at least one further face is designed so that it can be used to deflect or filter sensor signals wavelength-selectively. Owing to this selectivity of wavelengths, a selection of the various directions can be achieved in a simple manner. Similarly, a selection may also be achieved by polarization. Thus a multiple-axis sensor may also be implemented. A sensor of this kind may be employed independently from the device of the invention, basically for measurements on all, and especially absorbing or reflecting surfaces.

Another advantageous embodiment of the invention makes provision for at least one second light coupler for coupling evanescent fields with each other. By means of a coupling of evanescent fields with each other, a non-contacting coupling into or out of the light guide is possible at short distances.

A second light coupler for coupling evanescent fields is preferably designed to be a prism. For coupling, a prism of this kind may then be passed along above the light guide preferably at a distance of the order of magnitude of one half of a wavelength, i.e. a few micrometers or nanometers.

In another embodiment of the invention, the light guide comprises at least one boundary face preferably having reflective properties. A positive guiding of the light along the preferably circular contour of the light guide is made possible by reflection.

In another embodiment of the invention, the light guide comprises at least one material having a surface of mirror-like reflectivity. Thus it may be configured, for example, to be a trench having a mirror-finished surface in a metallic support. A machining for obtaining a surface of mirror-like reflectivity can be effected with diamond tools.

In another embodiment of the invention, the light guide comprises at least one material having a mirror-coated surface. Thus, a layer having mirror-like properties is additionally deposited onto the light guide. Layers of this kind can be deposited, for example, by electroplating or by vapor deposition in a vacuum. Gold is particularly suitable as a coating material, because it offers a very high coefficient of reflection at a wavelength of 1.3 micrometers for which low-cost optical components are available on the market. Furthermore, thereby an extremely corrosion-proof coating of the surface may be achieved.

In an improved embodiment of the invention, the mirror-coated surface is optionally obtained by means of a reflective or reflectively coated foil. A foil of this kind can be produced at low cost and coated in a simple way and manner onto any desired support, for example of plastic or metal. As an alternative to this, optionally a mirror-like reflecting layer can be deposited by electroplating or by vacuum coating to mirror-coat the surface. Particularly high coefficients of reflection may be obtained with layers of this kind.

Another advantageous embodiment of the invention is distinctive in that the surface comprises a multi-layer system capable of interference. Thereby, in an advantageous manner, a light guide in accordance with the invention may be so adapted that it preferably transmits wavelengths used for signal transmission, but no stray light from the surroundings. With this, an especially high suppression of extraneous light may be achieved, particularly in open light guides. Furthermore, in the case of a transmission of a plurality of channels with different wavelengths, a desired wavelength-selective reflection may be achieved.

Another embodiment of the invention provides for the surface to comprise a protective layer. A protective layer of this kind may, for example, prevent or at least slow down a contamination or even a chemical change such as an oxidation. This protective layer is preferably designed so that it affects the reflective properties of the underlying reflective layers as little as possible, and also causes as small as possible an attenuation of the light to be transmitted.

Another embodiment of the invention provides a light guide consisting of a fiber having a mirror-coated surface coating. A fiber of this kind that is provided on the outside for example with gold or a multi-layer coating capable of interference, is subsequently inserted into a prefabricated trench, or deposited or adhered onto another support. With this, the reflecting properties are no longer determined by the trench surface, but by the extremely smooth surface of the fiber. The fabrication cost can thereby be substantially reduced, because fibers can be produced a low cost, and at the same time the outlay of machining-down the usually large first unit is reduced.

In another embodiment of the invention, the light guide comprises a tube that is mirror-coated on the outside or inside. A tube of this kind can be inserted in the same way as the previously described fiber, and offers the same advantages.

Another advantageous embodiment of the invention comprises a light guide having converging properties in at least one plane. Thereby a divergence of the light beam can be reduced, or the light beam further bundled.

Another advantageous embodiment of the invention provides that the light guide has at least on one side a boundary face to air, in which a wave similar to a film wave or surface wave can be guided. A wave of this kind propagates in the boundary layer of the light guide to the surrounding medium, and can be coupled in from or out to the outside by a coupler. In an advantageous manner a prism is employed for coupling.

In another embodiment of the invention an optical grating is mounted at the light guide for coupling out light. Optical gratings of this kind can be incorporated in a particularly simple and space-saving manner. An isolation of the various segments from each other can be achieved simultaneously with a grating of this kind, for example when it conducts the light out of the light guide at the boundaries. Furthermore, these gratings may be designed to be wavelength-selective, so that different wavelengths may be coupled out at different locations. With this, a multi-channel signal transmission in a wavelength-multiplex mode may be achieved within a very small space.

Another embodiment of the invention provides a Fresnel structure on the light guide for coupling out light. Structures of this kind can be achieved with modern molding techniques at particularly low cost.

In another advantageous embodiment of the invention, optionally the optical transmitter or the optical receiver are designed to be light couplers at the same time. Thus, for optical receiving for example, a photodiode can be directly incorporated optionally into the first or the second unit instead of a light coupler having an optical receiver connected to follow. It thereby combines the operational features of an optical receiver and a light coupler. Similarly, for example a laser diode or an LED for emitting light can be incorporated optionally into the first or the second unit. It thereby combines the operational features of a light coupler and an optical transmitter.

Another advantageous embodiment provides a light guide that is of freely-selected shape along the direction of propagation of the light. For this, the shape of the light guide must be conformed so that an optimal transmission results with minimal attenuation and minimal dispersion. Preferably the light guide is designed to be a polygon or a circle.

In the case of a polygon-shaped design of the light guide, it may consist preferably of a plurality of similar or different segments which have optionally focusing or beam-shaping characteristics. Thereby a bundling of a beam along the light guide can be maintained or even improved.

Furthermore, a feeding or coupling of optical signals from the first unit into the light guide may be effected by means of a light-guiding fiber.

In another advantageous embodiment of the invention, for coupling optical signals from the first unit into the light guide, at least one lens of freely-selected shape is provided for optimal beam focusing. This lens focuses the light coupled into the light guide so that it is transmitted along the light guide with low attenuation and low dispersion. As a lens having a freely-selected shape of particularly simple design, a spherical lens or a cylindrical lens may be used. A lens may be used as a discrete component, or also formed onto a light-guiding fiber.

Another advantageous embodiment of the invention comprises at least one deflecting unit for coupling optical signals from the first unit into the light guide. Because of the beam deflection by the deflecting unit, the direction of the beam of the light to be coupled in need no longer extend tangentially to the light guide. Owing to the deflection, the constructional size can be reduced considerably. The deflection is effected preferably by means of a mirror, a prism, or a suitably shaped end of a light-guiding fiber.

Another advantageous embodiment of the invention can be used for simultaneous transmission of a plurality of channels, by different optical wavelengths being provided for transmission. Because of a wavelength-selective emission of signals, and a wavelength-selective reception of signals, they may be distinctly separated from each other.

An especially advantageous embodiment for wavelength-selective transmission of a plurality of channels is obtained when, in particular, a plurality of first light couplers are disposed at different locations along the light guide. Advantageously the means for isolation should then be provided to be wavelength-dependent at suitable positions. Similarly, advantageously the second light couplers are suitably disposed at different locations on the second unit. This arrangement at different locations simplifies the mechanical mounting of light couplers, and reduces the outlay of optical components.

Furthermore, advantageously at least one means for optical isolation is designed to be wavelength-selective.

Preferably a plurality of means for optical isolation are designed to be wavelength-selective and disposed at both locations corresponding to the boundaries of a segment for a respective wavelength. This embodiment permits, for example, segmentations that differ in wavelength-dependence, or different arrangements of segment boundaries, as are necessary with an arrangement of the light couplers at different locations.

Another advantageous embodiment of the invention provides for polarized light to be transmitted in the light guide. Measurements have shown that many light guides transmit light of a certain polarization with particularly low attenuation. Of special advantage is, for example, a transmission of light having a polarization perpendicular to a plane of incidence, for example to a metal surface as used, for example, with a mirror-coated trench as a light guide. Preferably, the polarized light is generated by means of a polarized light source. Similarly, polarization filters may also be provided in the optical path. These may be incorporated in the light coupler, for example. Furthermore, the polarization may be adapted in dependence upon position, in order to compensate the dependence of the attenuation upon the position.

In another advantageous embodiment of the invention at least one polarization-sensitive receiver is provided. Optionally a polarization filter can be inserted to precede a receiver. If a non-polarized light source is used for emitting signals, then the light propagates with different attenuations, and frequently also with different transit times, in dependence upon the polarization. Now, a definite polarization together with a defined transit time or a defined attenuation can be selected with a polarization-sensitive receiver. This results in a substantially position-independent amplitude and also the smallest of signal distortions.

Another advantageous embodiment of the invention provides for a plurality of optical transmitters to be provided for emitting polarized light, and for a plurality of polarization-sensitive optical receivers to be provided for receiving polarized light. For this, a plurality of groups of optical transmitters and receivers are formed, the polarizations of which are each tuned to each other so that a signal transmission occurs within each group, but no signals are transmitted to receivers of other groups. Thereby a multitude of channels may be transmitted at the same time via different polarizations.

In another embodiment of the invention, the signal transmission is effected by means of a modulation of the polarization. For this, at least one optical transmitter is provided which preferably emits polarized light. Furthermore, at least one means for modulation of the polarization of the transmitter is provided optionally in the transmitter itself, or in the optical path between the transmitter and the receiver. For evaluating the modulation of polarization, an optical receiver having means for converting a change of polarization into a modulation of amplitude is provided. This may be a simple polarization filter, for example.

In another embodiment a mechanical encapsulation of the light guide is provided. This encapsulation protects the light guide from undesired mechanical influences and, in particular, from contamination.

Another advantageous embodiment of the invention provides an encapsulation which is sealed from the surroundings by a labyrinth and/or a gap seal. Preferably the inner space is at a higher air pressure than the outside. Of course, this inner space may also be filled with any other gas instead of air. Nitrogen, for example, is especially well suited for this.

In another embodiment of the invention, the encapsulation is sealed from the surroundings by means of an abutting lip or a plastic foil.

Correspondingly, in another embodiment of the invention an electrostatic screen is additionally provided. This affects electrically chargeable, or electrically charged particles by means of electric fields. Particles of this kind can now be deflected away from the light guide, so that it cannot be contaminated by them. If for example, a device in accordance with the invention is incorporated into an instrument together with conventional sliding contacts for energy transmission, then the abrasion originating from the sliding carbon contacts would contaminate the light guide within a short time so that its attenuation would attain unacceptably high values. By means of an electrostatic screen, carbon dust can now be kept away from the light guide, so that the contamination of the light guide is substantially reduced.

In another embodiment of the invention, parts of the encapsulation or receptacle of the light guide comprise a micro-surface. Surfaces of this kind prevent an adhesion of contamination, for example carbon dust from adjacent slide tracks. Owing to air currents caused by a supply of air, for example a supply to a hydrostatic bearing, or also caused by the movement of the coupling slide, the contamination that cannot adhere firmly to the micro-surface is blown away from the surface.

FIG. 1 shows in a schematic form a plan view of a device according to the invention. A first unit 1 serves to accommodate an annular light guide 3. This light guide is, for example, a trench coated on the inner side. A second unit 2 rotates about a rotation axis 6 with respect to the first unit. A coupling slide 65 is connected to the second unit and supports a second light coupler 5. A means for optical isolation 13 is disposed to be symmetrical with respect to a coupling-in location of the first light couplers, so that light paths 32 on both sides are of the same length. Light can be transmitted from the first unit to the second unit, and also in an opposite direction from the second unit to the first unit. Light-guiding fibers 4a, 4b are provided to supply light to the light guide. A conducting of light from the light coupler is effected by means of a light-guiding fiber 7.

Figure 2:
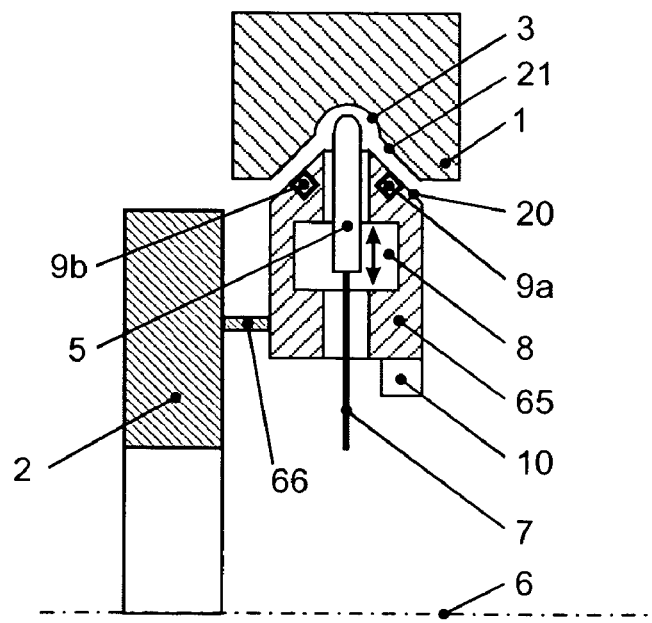
FIG. 2 schematically shows a cross-section of a device according to the invention.

FIG. 2 shows in a schematic form a section through a device according to the invention. In this, both the first unit 1 and the second unit 2 are shown as disks having a central bore, which are supported to be rotatable about the central rotation axis 6. The coupling slide 65 runs along the light guide 3 and is carried by a take-up member 66 along the movement. Here the light guide 3 is shown by way of example as a trench that is mirror-coated on the inner side. It extends around the entire circumference of the first unit. Engaging with this trench is a second light coupler 5 that is disposed on the second unit 2. This light coupler taps off the light guided in the light guide and passes it on by means of a light-guiding fiber 7. A hydrodynamic bearing means and also an electro-dynamic bearing regulation are provided for an exact alignment of the light guide and the second light coupler along an axis. The hydrodynamic bearing means is based on a thin air film that is formed between a first bearing face 21 and a second bearing face 20 by the movement of the two units relative to each other. Support is provided, for example, by additional means for guiding air. Furthermore, in an advantageous manner the device has emergency running properties which ensure certain guiding properties even at low speeds without a sufficient air film, as is the case, for example, during an acceleration or braking phase. Furthermore, for an exact positioning, a sensor 9 is provided to determine the distance between the two units. Here this sensor scans the distance to a reference track 11 which in the present example is identical with the first bearing face 21. Output signals from the sensor are processed by means of a control unit 10, and are passed on to an actuator 8 for exactly regulating the position of the second light coupler.

Figure 3:
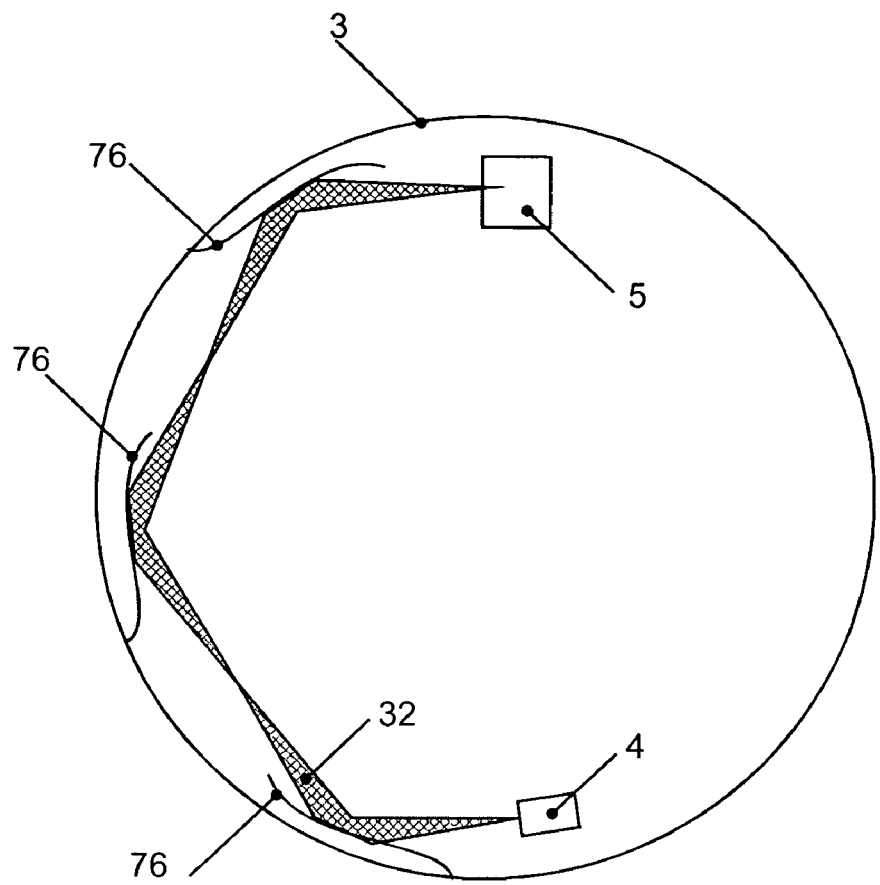
FIG. 3 shows a device according to the invention having a light-guide of a freely-selected shape.

FIG. 3 shows a device according to the invention with a light guide of a freely-selected shape. The light emitted by a first light coupler 4 is carried along given tracks to the second light coupler 5 by means of a plurality of faces 76 of freely selected shape. The shapes of the faces may all be the same or different. Preferably these faces are designed to guide or shape the light beam 33 so that it can be conducted with as small as possible an attenuation.

Figure 4:
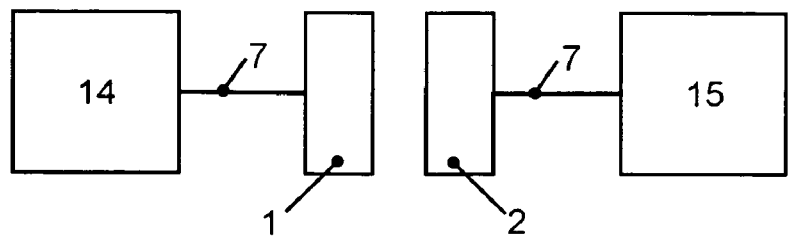
FIG. 4 schematically shows a transmission of optical signals from a first unit to a second unit.

In FIG. 4 a transmission of optical signals from the first unit to the second unit is illustrated schematically. An optical transmitter 14 generates modulated optical signals which are relayed, for example by means of a light-guiding fiber 7, to the first unit 1. From there a coupling to the second unit 2 is effected which transmits the optical signals by means of another light-guiding fiber 7 to an optical receiver 15 for evaluation.

Figure 5:
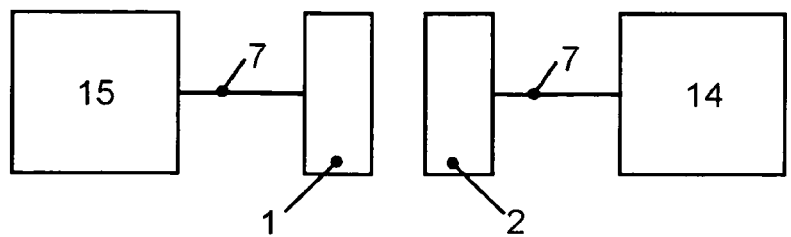
FIG. 5 schematically shows a transmission of optical signals from the second unit to the first unit.

FIG. 5 shows analogously, in an opposite direction to the preceding Figure, a transmission of optical signals from the second unit to the first unit.

Figure 6:
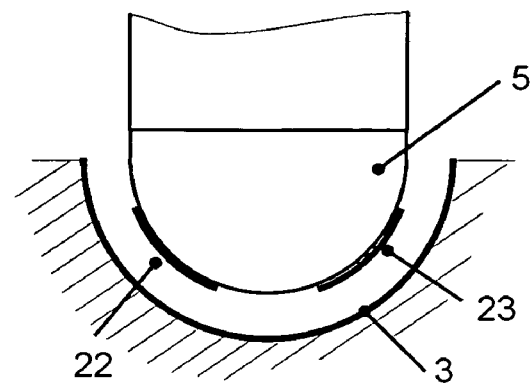
FIGS. 6, 7, and 8 show a capacitive position sensor.

In FIG. 6 a capacitive sensor for determining the position of the second light coupler 5 with respect to the light guide 3 is illustrated by way of example. A first capacitive sensor face 22 and also a second capacitive sensor face 23 are mounted on the second light coupler, or on a component connected to it. In this embodiment, the light guide or a face located below the light guide, such as for example a support of the light guide, must be designed to be electrically conductive. For determining the position of the second light coupler with respect to the light guide, the capacities between the first capacitive sensor face and the light guide, and also between the second capacitive sensor face and the light guide, are determined and evaluated. A capacitive sensor of this kind may also be designed to be independent from the light guide and the second light coupler. For a determination of position in one plane, it also may have only one capacitive sensor face. Similarly, it may preferably run in a U-shaped or V-shaped trench that serves exclusively for position determination. Preferably this trench comprises two faces that are perpendicular to each other.

Figure 7:
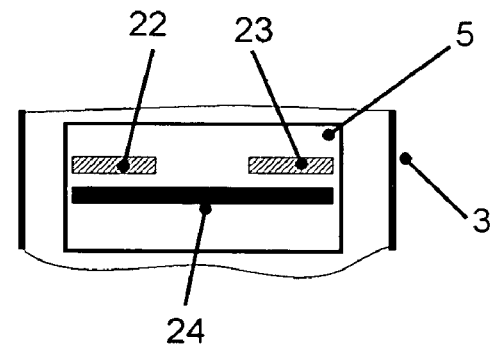

FIG. 7 shows a particularly advantageous embodiment of a capacitive sensor with which a capacitive reference face 24 is additionally provided. As the light guide that is movable relative to the second light coupler normally cannot be contacted for electrical measurements, the additional capacitive reference face can now be used as a reference.

Figure 8:
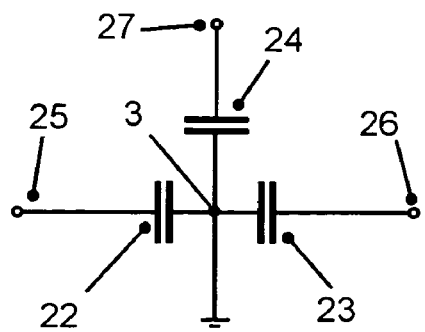

FIG. 8 shows an electrical equivalent circuit diagram with the capacities of the first capacitive sensor face 22, the second capacitive sensor face 23, and also the capacitive reference face 24 for the light guide 3. As the light guide cannot be directly contacted, a measurement for determining a first position is effected between a first contact point 25 and a reference contact point 27. A measurement for determining a second position is effected between a second contact point 26 and the reference contact point 27. In order to obtain as large as possible a measurement signal, the capacity formed by the capacitive reference face 24 is chosen to be as large as possible. The center position for the guiding may be determined easily by evaluating the capacity differences between the contact points 25, 26 and the reference contact point 27. The absolute value of the capacities is a measure of the absolute height above the center of the trench.

Figure 9:
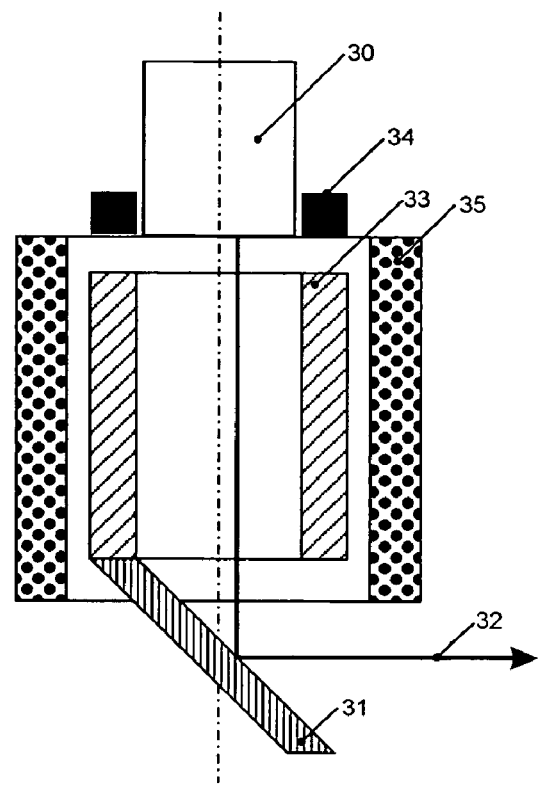
FIGS. 9 and 10 show second light couplers that are incorporated in an actuator.

FIG. 9 shows a particularly advantageous embodiment of a second light coupler incorporated in an actuator. The path of the light 32 extends from the optical system for beam guiding or shaping 30, for example a collimator, via the mirror 31 in the direction of a light guide not shown here. Of course, the light path may also extend in the opposite direction. The mirror 31 is attached to an armature 33. A guiding or bearing function is effected by a magnetic field of a permanent magnet 34 and a coil 35. The embodiment illustrated here offers the advantage of a mechanical decoupling of a light guide, or a light source, or a receiver, on the side of the collimator facing away from the light guide. However, in order to achieve a substantially lower coupling attenuation, a waveguide can be employed instead of the collimator and the mirror. This embodiment is also less sensitive to contamination.

Figure 10:
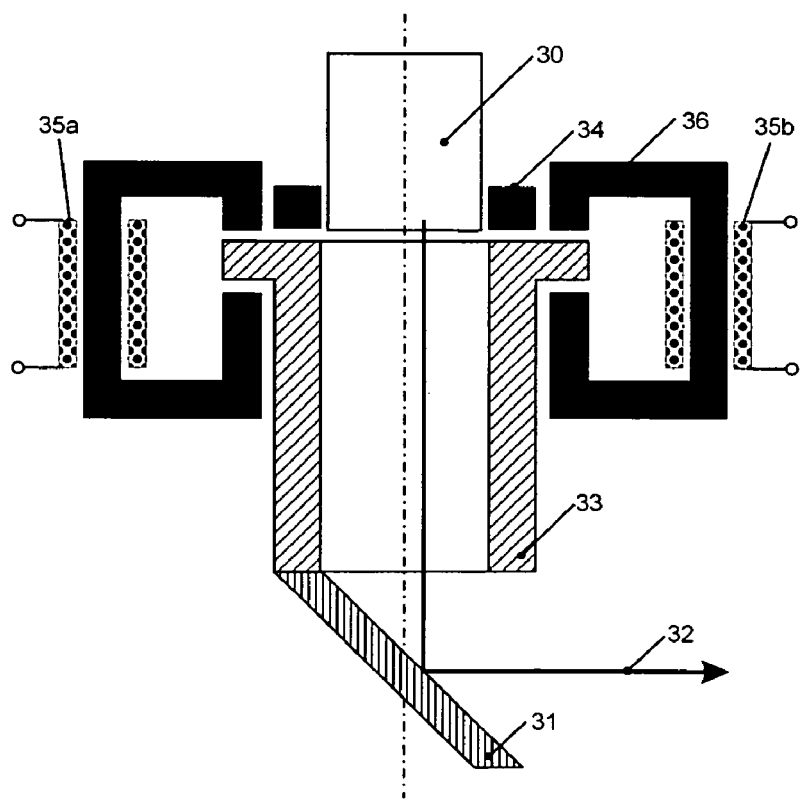

FIG. 10 shows another embodiment of a light coupler incorporated in an actuator. The embodiment is similar to that of FIG. 9. However, at least one yoke 36 is provided for conducting the magnetic field generated by at least one coil 35a, 35b.

Figure 11:
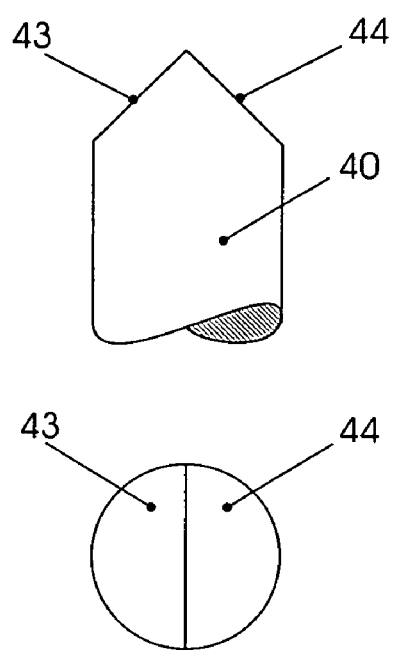
FIG. 11 shows an optical position sensor.

In FIG. 11 an optical position sensor is illustrated. Advantageously, a position sensor of this kind runs, as does a second light coupler 5, in close contact with the light guide 3. It comprises an optical waveguide 40 that is fed with light of at least one wavelength from a not shown light source. In dependence upon the closeness of an approach of a first sensor face 43 or a second sensor face 44 to the respective boundaries of the light guide, the light is more or less strongly reflected. An evaluation of the intensity of the reflected light is effected in a not shown sensor unit that also performs a wavelength-selective evaluation in the case of a plurality of wavelengths. Thus, for example, a first sensor face 43 can operate at a first wavelength, whilst a second sensor face 44 can operate at a second wavelength. For this, wavelength-selective filters are preferably mounted to the exit faces. In addition to an evaluation of intensity, the arrangement can also be designed so that the polarization of the reflected light changes according to the distance. The sensor is shown in FIG. 11 in a side view, and below this, in a plan view. This sensor could also be turned through 90° and used as a light coupler. In this case, a first sensor face 43 would correspond to a first coupling face 41, and a second coupling face 44 to a second sensor face 42. Furthermore, a sensor of this kind could also comprise a plurality of coupling faces for performing measurements along a plurality of axes.

Figure 12:
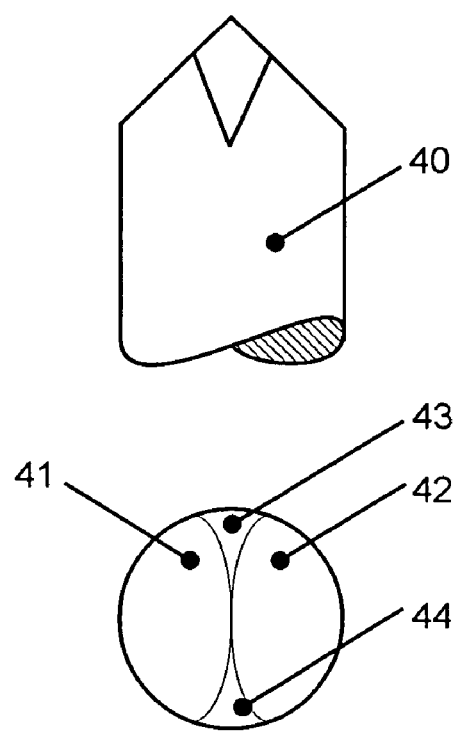
FIG. 12 shows a second light coupler with an incorporated optical position sensor.

FIG. 12 shows a second light coupler that is combined with a position sensor in one unit. By way of addition to the previously shown drawing, here a first coupling face 41 and also a second coupling face 42 are provided to couple light into or out of the light guide, for transmission of information.

Figure 13:
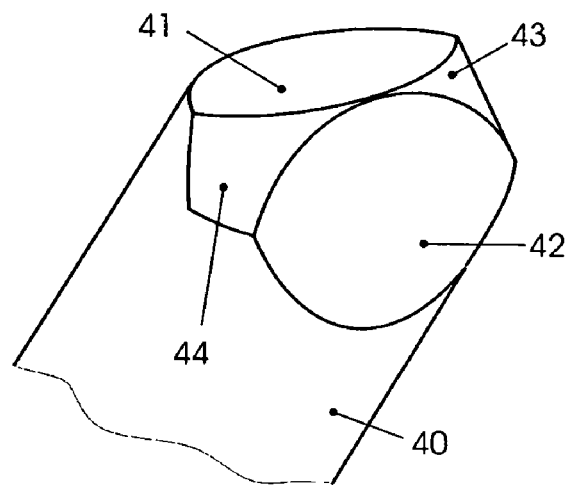
FIG. 13 shows the second light coupler of FIG. 12 as illustrated in a perspective view.

FIG. 13 shows the second light coupler of FIG. 12 as illustrated in a perspective view.

Figure 14:
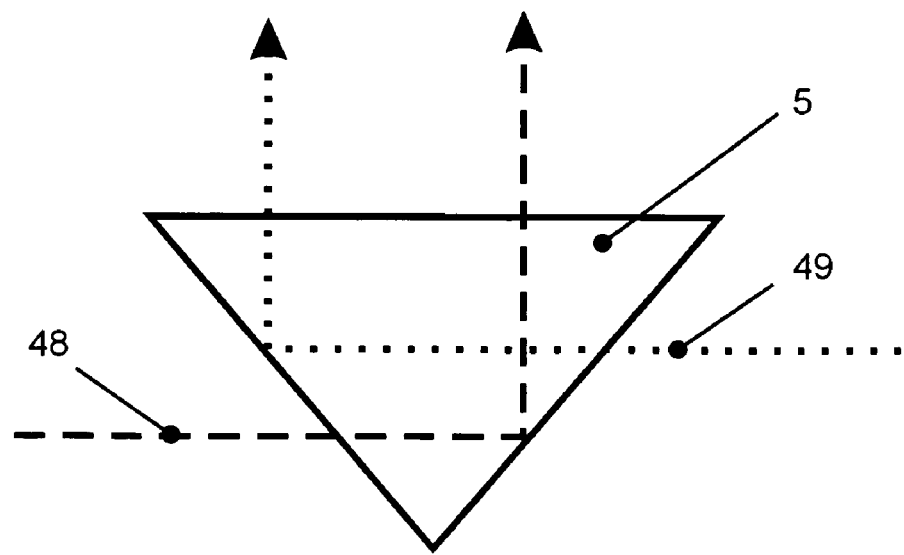
FIG. 14 schematically shows a coupling of light into or out of a light guide by means of a second light coupler.

In FIG. 14. the principle of light coupling and light deflection is illustrated. Thus, for optical coupling, optionally light carried in different directions of the light coupler 3 is deflected in a second light coupler 5. The deflection is effected preferably by refraction. In this way light may be coupled both into and out of the light guide. The beams as drawn do not correspond exactly to a physical beam path, but nevertheless schematically reproduce the carriage of signals correctly.

Figure 15:
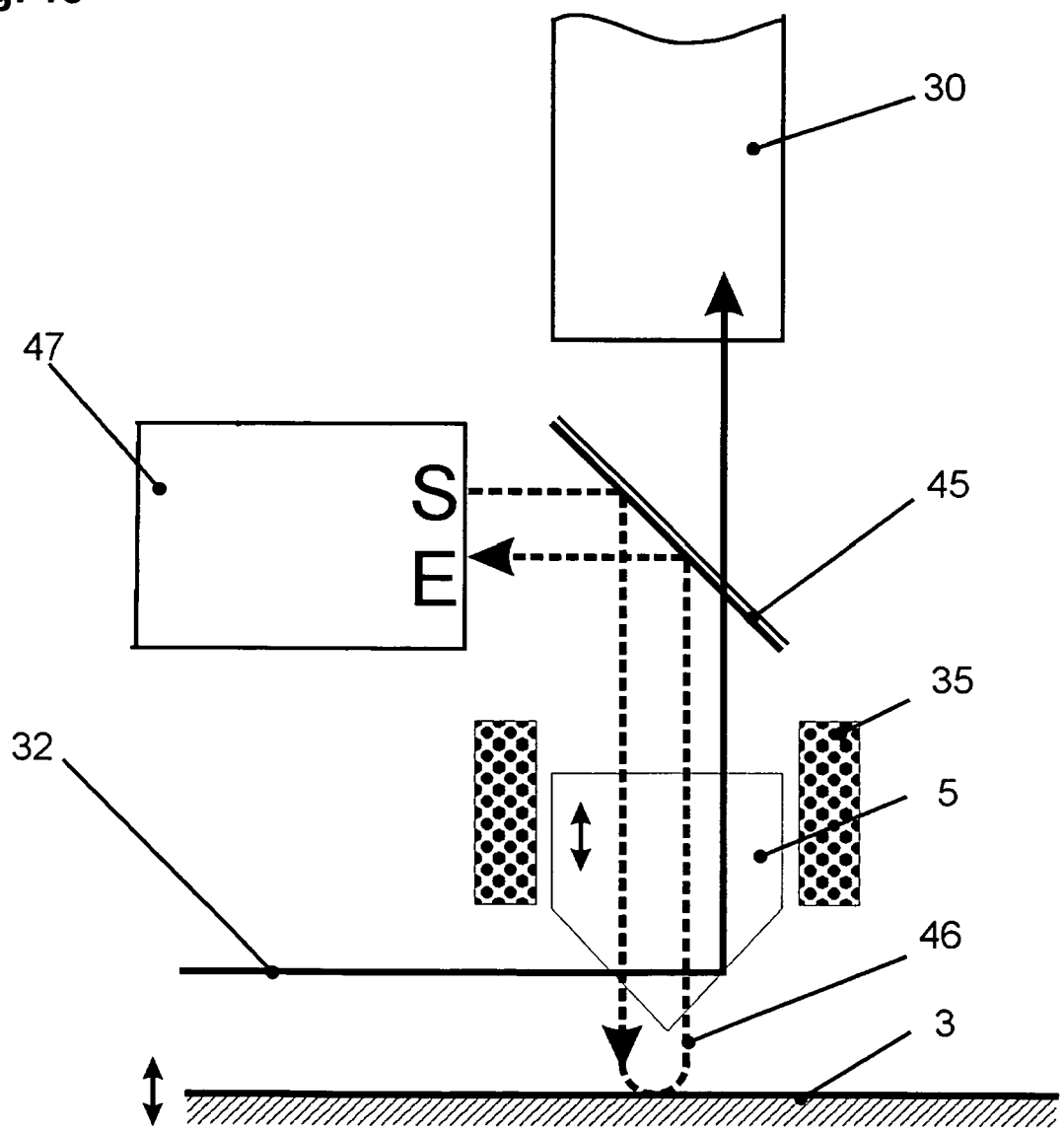
FIG. 15 shows a schematic construction of a control, and an incorporation of a second light coupler having an incorporated optical position sensor.

In FIG. 15 the construction and incorporation of a second light coupler having an incorporated optical position sensor is schematically illustrated. A second light coupler 5 is disposed to be movable and to have its height varied by suitable control of the coil 35. Guidance of a beam 32 of the light from the light guide 3 is effected by means of a second light coupler 5 into an optical system 10 for beam guidance or shaping. This system can pass on the light, for example into a light-guiding fiber 7. Similarly, however, a light-guiding fiber without any additional beam shaping system may be disposed already at this position. Of course, light may also be transmitted in the opposite direction. For determining the exact position, light is deflected by a position-sensor transmitter/receiver 47 by means of a wavelength-selective mirror 45 located in the beam path along the direction of the second light coupler 5 by means of which it is coupled into the light guide for position determination, as has already been described. The light 46 that has been reflected in dependence upon the position is once more transmitted via the second light coupler and the wavelength-selective mirror back to the position-sensor transmitter/receiver 47 for evaluation. The latter can now determine the location of the second light coupler from the light intensity, and emit a suitable measurement signal to the control unit for controlling the coil 35 of the actuator. Instead of a wavelength-selective mirror, a commercially available mode-insensitive achromatic coupler also may be used, but with higher attenuation. In this case, optionally also a waveguide may be used for signal feeding-in and signal coupling.

Figure 16:
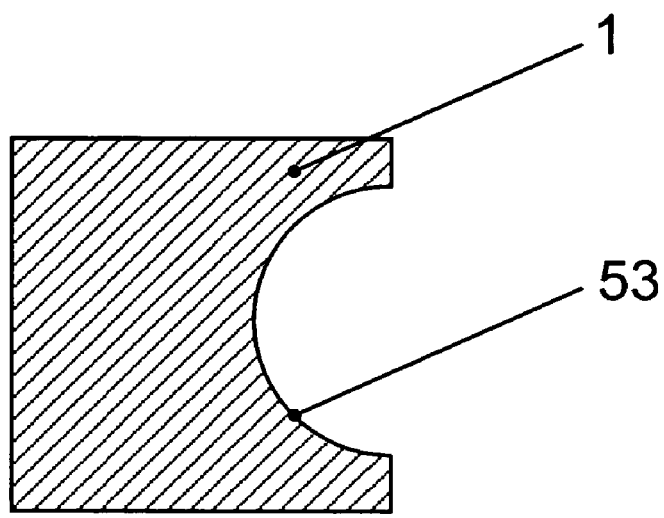
FIG. 16 shows a light guide having a reflective coating.

In FIG. 16 a light guide 3 having a reflective coating is illustrated. In this case, the light guide consists of a groove formed in the first unit 1. The surface of this groove is provided with a reflecting coating 53.

Figure 17:
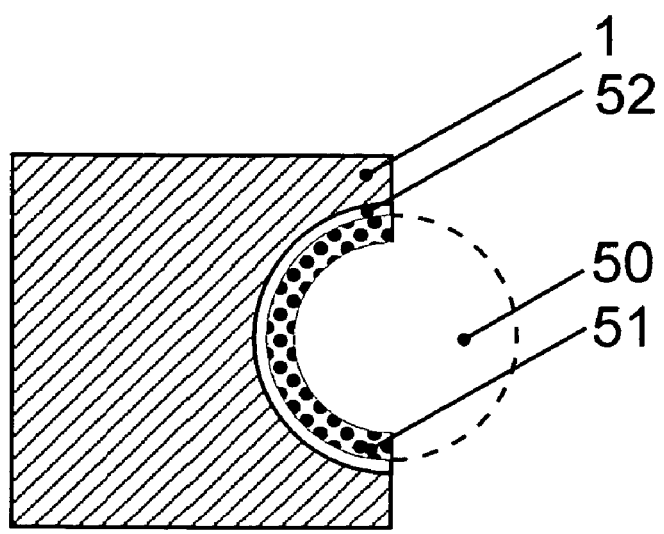
FIG. 17 shows a light guide consisting of a coated fiber.

In FIG. 17 a light guide is illustrated that is fabricated from a coated tube. A reflectively coated tube 50 is fixed in position in a suitable groove in a first unit 1 by means of an adhesive. In order to obtain a trench-shaped, open light guide, this is now subjected to finishing treatment to achieve a final contour 51. As an alternative to this, the processing may be performed before the fixing in position by means of the adhesive. A coated fiber also may be used in the same way as this tube.

Figure 18:
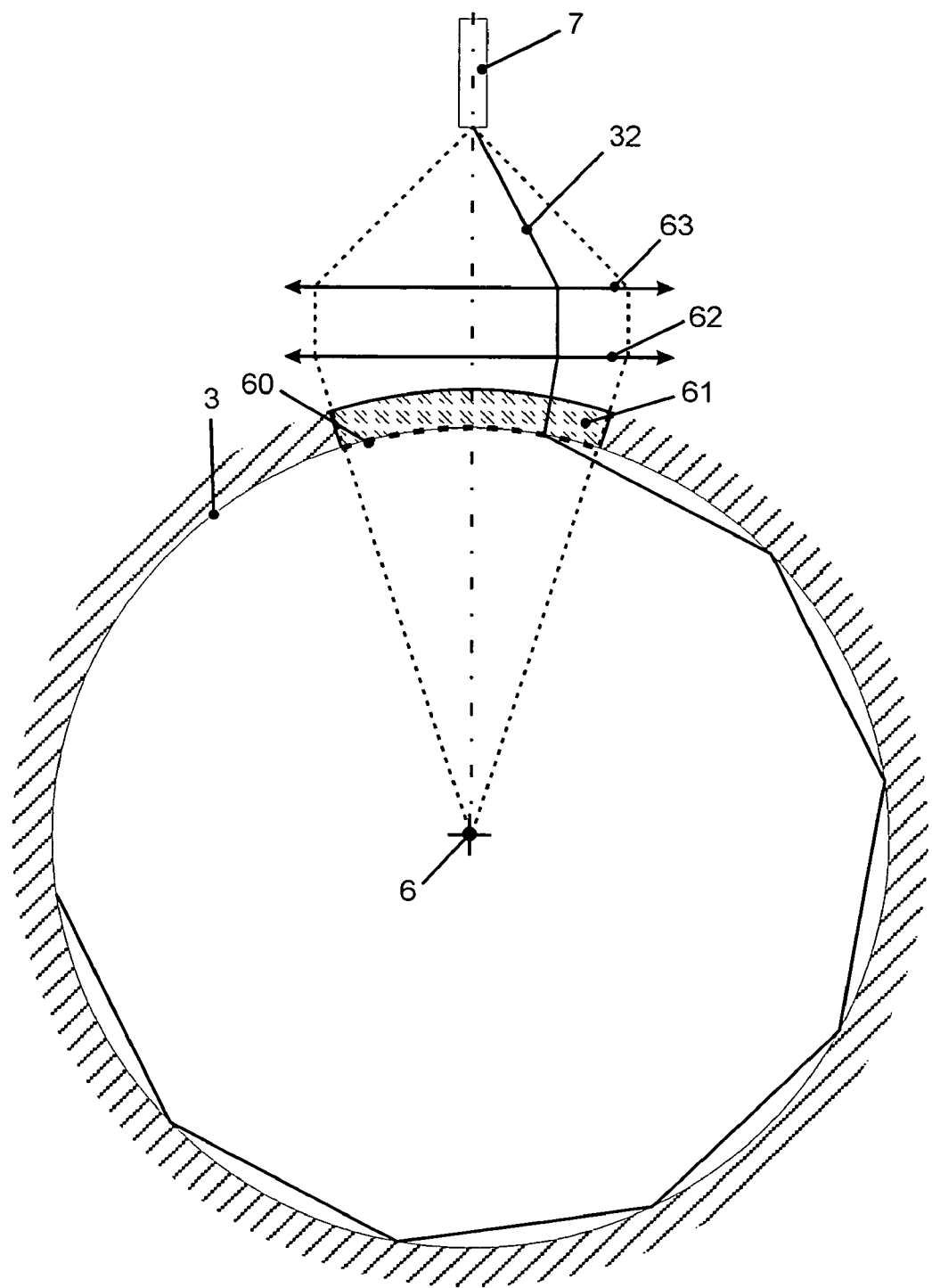
FIG. 18 shows a principle of the construction of a grating coupler.

In FIG. 18 the principle of the construction of a grating coupler is illustrated. In this embodiment, the light guide 3 has a recess in the shape of an arcuate segment along its circular circumference about the rotation axis 6. This recess contains optically transparent material 61 which supports an optical grating 60. Light rays 32 striking the grating within this arcuate segment are deflected towards the outside by the grating, and focused onto an entry opening of a light-guiding fiber 7 by means of a first lens 62 and a second lens 63. Of course, other lens arrangements are also feasible. Because the individual light rays all strike the grating at the same angle, although at different positions, an unchanging lattice constant may be used for the entire arcuate segment. Thus, an order of diffraction may be obtained that corresponds to a divergent wave having its origin on the rotation axis 6. This point represents the focal point for all coupled-out signals. It is imaged onto the end of the light-guiding fiber 7 by means of the two lenses. The device is particularly insensitive to dust and other contamination, because the substantial components of the optical system, viz. the two lenses, and also the light-guiding fiber, can be disposed in a protected region. Furthermore, the light guide itself has no kind of openings or undercuts necessitated by the inserted optical grating, at which contamination could become deposited.

Figure 19:
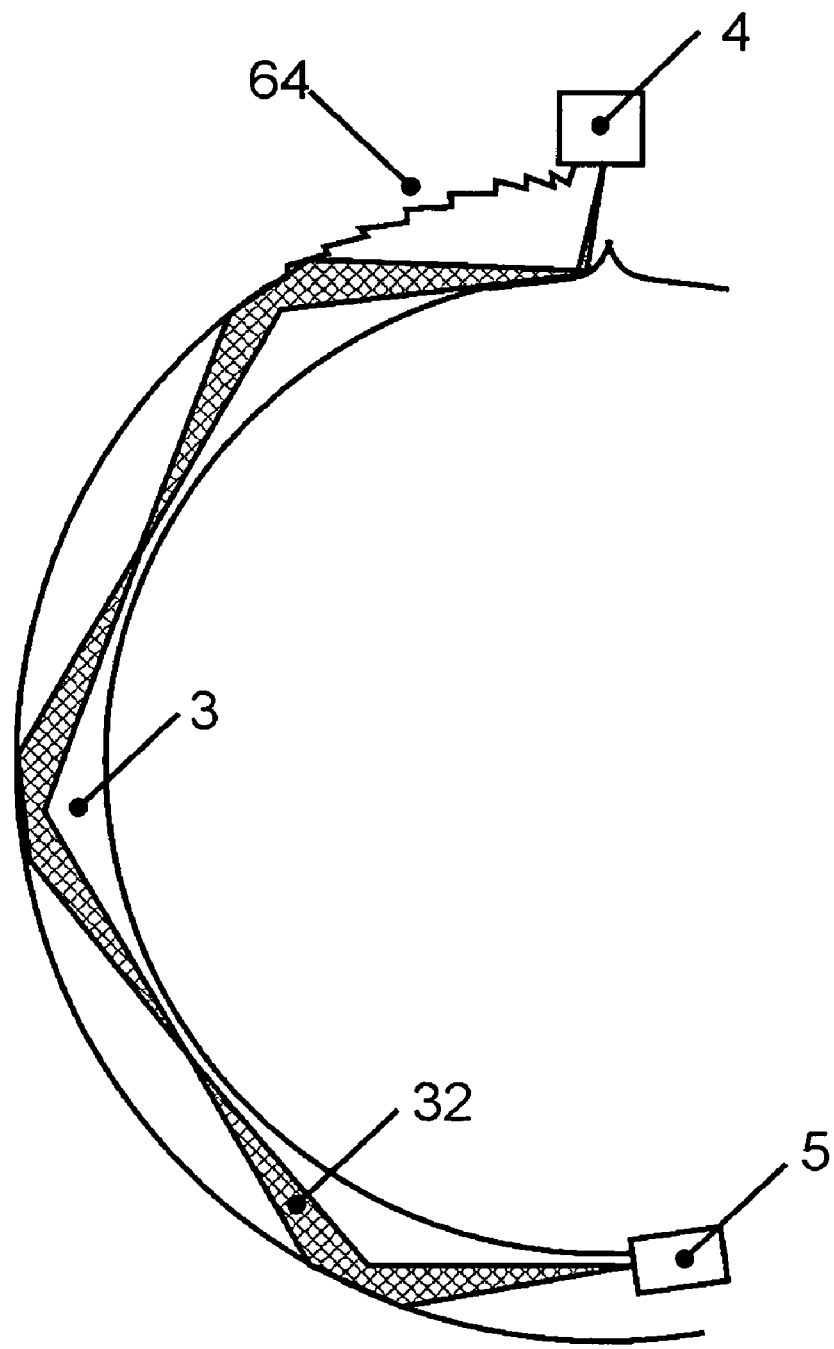
FIG. 19 shows a signal coupling by means of a Fresnel structure.

In FIG. 19, signal coupling by means of a Fresnel structure 64 is illustrated. In the vicinity of a first light coupler 4, light from the light guide 3 assigned to a first unit 1 is supplied to a step-shaped structure for deflecting the beam emitted by a second light coupler 5 in the direction of the first light coupler.

Figure 20:
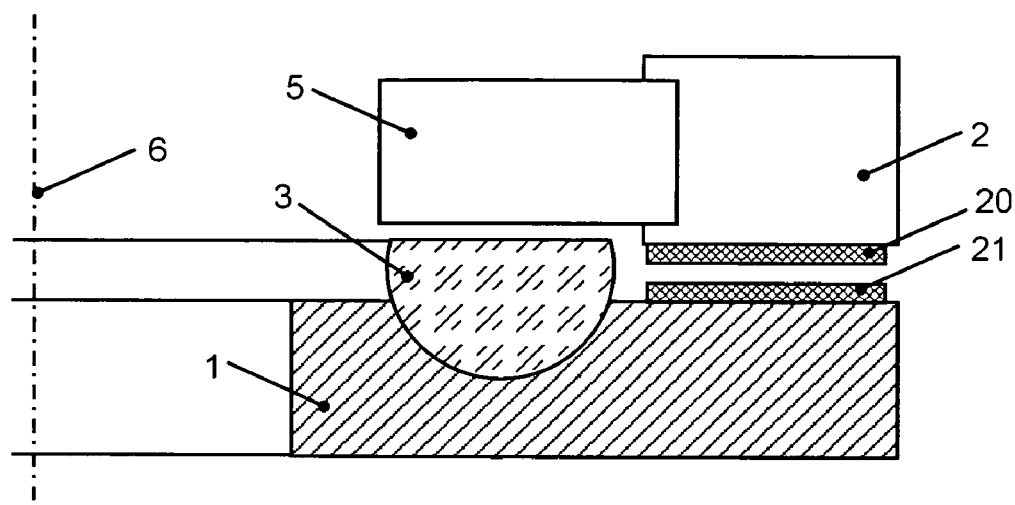
FIG. 20 shows a device for coupling-in a surface wave.

FIG. 20 shows an embodiment of the invention for coupling-in a film wave or surface wave. Here the light guide 3 is shown by way of example as a fiber having a ground core portion. For coupling, a prism 5 is moved along, and with a close spacing from, the ground face of the light guide. In the present example (not shown), light is coupled from above into the prism. For exact alignment, a hydrodynamic bearing means comprising a first bearing face 21 and a second bearing face 20 is provided. Suitable bearing elements may also be provided perpendicularly hereto for stabilization along a direction of a second axis. Even the light guide itself may be employed as a bearing face.

Figure 21:
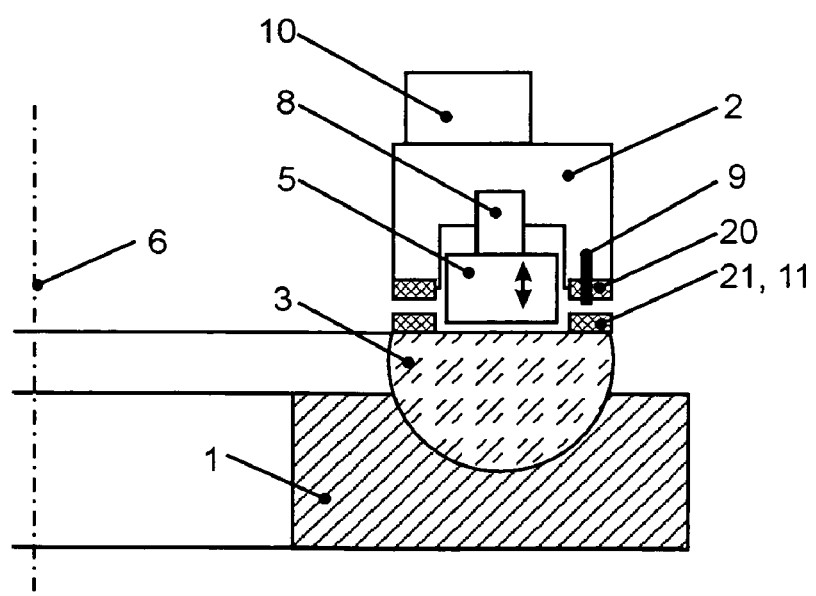
FIG. 21 shows a device having an incorporated active and passive position regulation.

FIG. 21 shows another embodiment of the invention, in which a hydrodynamic bearing means supplemented by an active position regulation is provided. One of the first bearing faces 21 simultaneously serves as a reference track 11 for the sensor 9.

Figure 22:
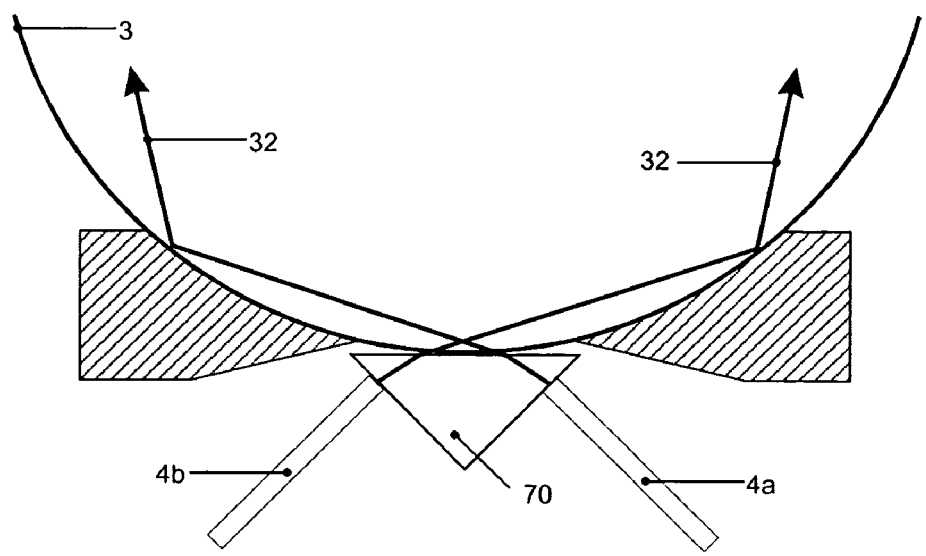
FIG. 22 schematically shows a coupling onto a light guide by means of a prism.

In FIG. 22 a coupling onto a light guide by means of a prism is shown schematically. A supply of light is effected by means of light-guiding fibers 4a, 4b. The light from these fibers is deflected by means of a prism 70 at an angle at which it can be conducted in the light guide. In this Figure, the not designated, hatched face represents a cutout portion of the first unit 1 in which the light guide 3 is accommodated.

Figure 23:
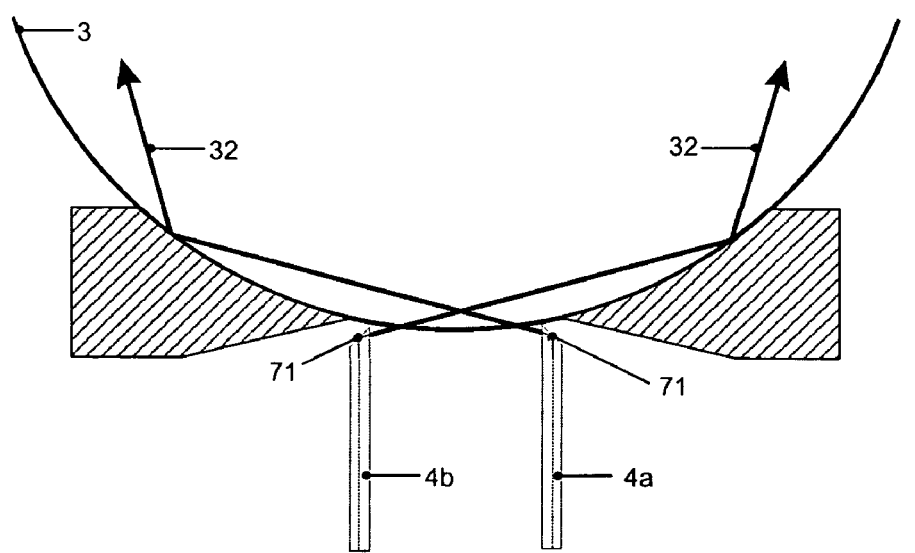
FIG. 23 schematically shows a coupling onto the light guide by means of light-guiding fibers having ground ends.

FIG. 23 schematically shows a coupling onto the light guide by means of light-guiding fibers 4a, 4b having ground ends. The deflection of the light is effected in this case by a suitable design of the fiber ends, instead of a prism.

Figure 24:
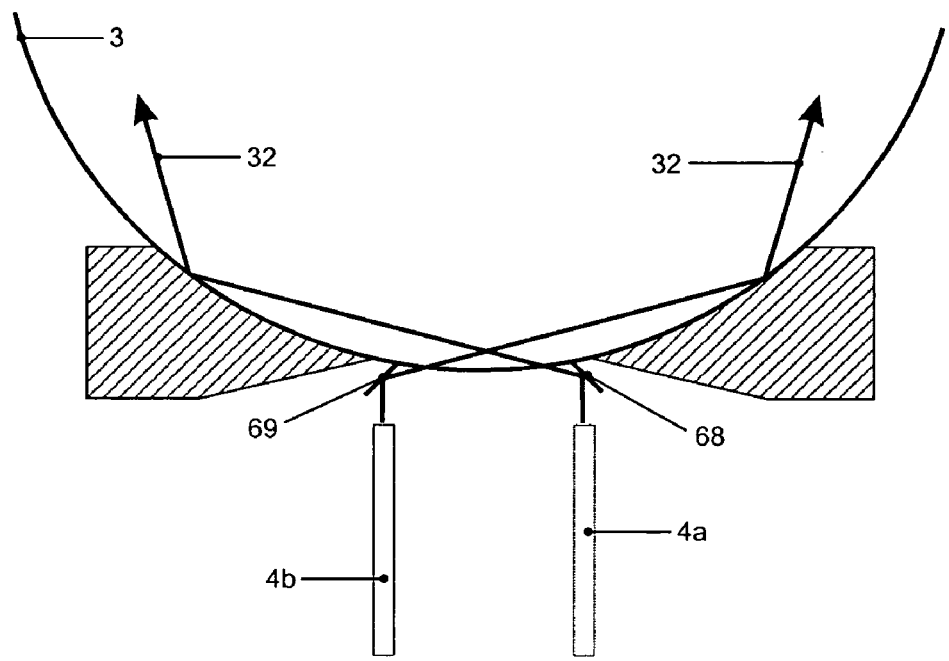
FIG. 24 shows a coupling onto the light guide by means of mirrors.

FIG. 24 shows a coupling onto the light guide by means of mirrors 68, 69.

Figure 25:
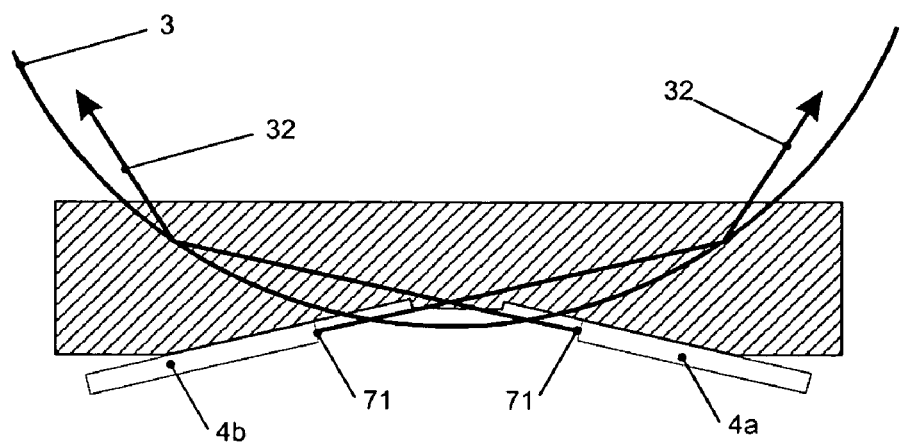
FIG. 25 shows a coupling onto the light guide by means of light-guiding fibers.

FIG. 25 shows a direct coupling onto the light guide by means of light-guiding fibers.

Figure 26:
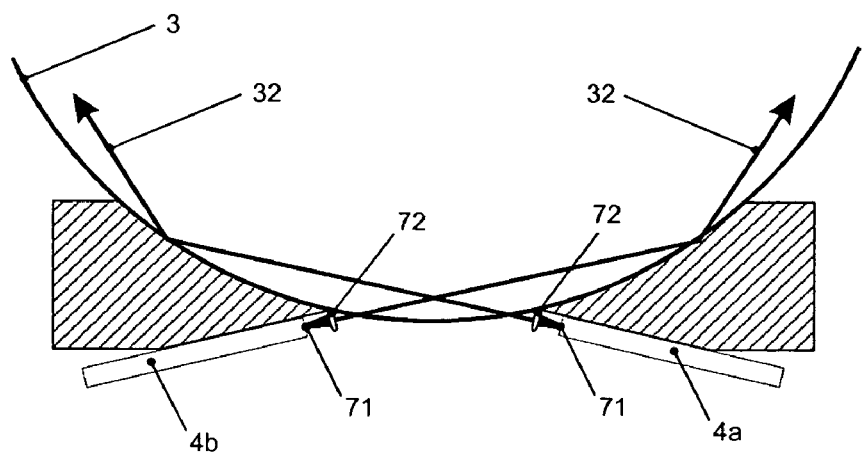
FIG. 26 shows a coupling onto the light guide by means of lenses.

FIG. 26 shows a coupling onto the light guide by means of lenses 72. With these lenses, an additional beam shaping of the light emerging from the fiber ends 71 of the light-guiding fibers 4a, 4b is effected.

Figure 27:
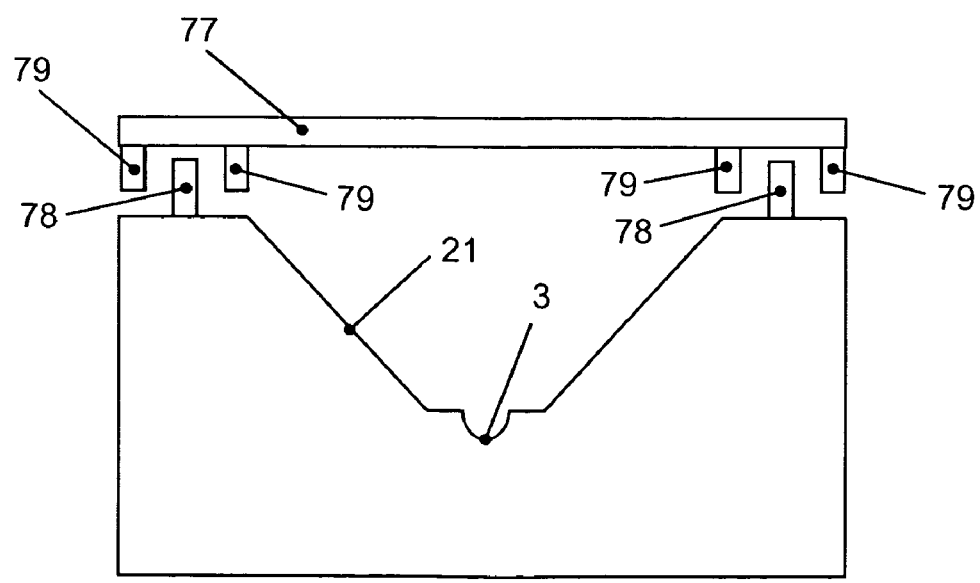
FIG. 27 shows an encapsulated arrangement.

FIG. 27 shows an encapsulated arrangement. Here, by way of example, the light guide 3 is incorporated in a trench formed by bearing faces 21. For encapsulation, a cover 77 is provided that advantageously comprises additional ribs 79 which together with ribs 78 of the first unit form a labyrinth seal. Of course, a cover without these ribs is also feasible.

Figure 28:
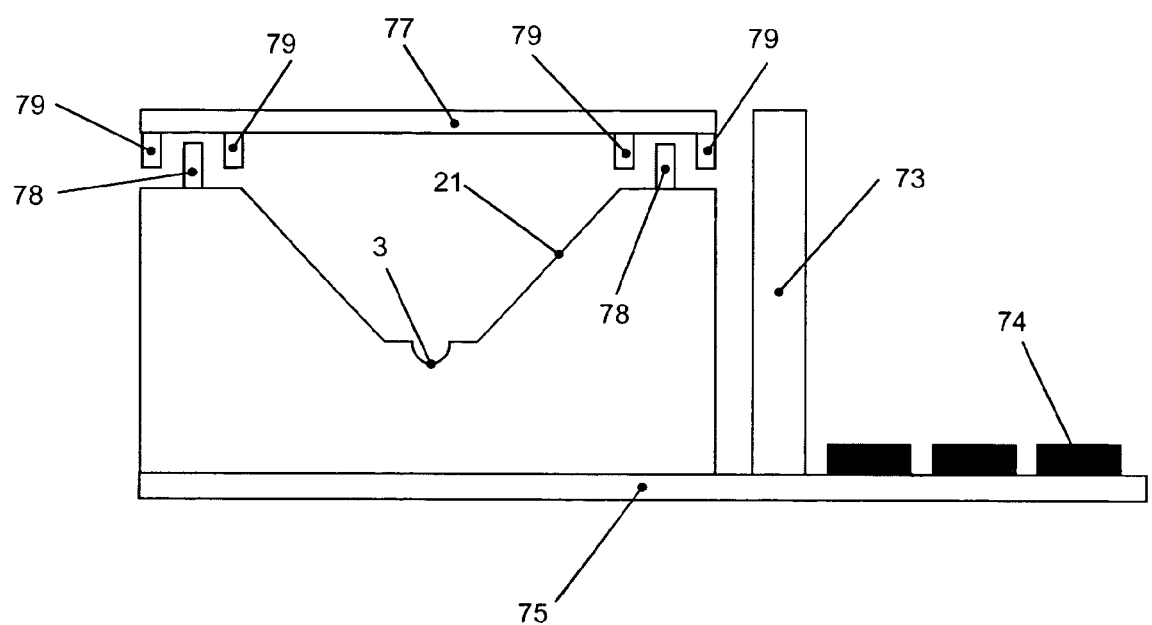
FIG. 28 shows an encapsulated arrangement having an electrostatic screen.

FIG. 28 shows an encapsulated arrangement corresponding to that of the preceding Figure, but with the addition of an electrostatic screen 73. By way of example, this electrostatic screen is disposed on a common support plate 75 together with slide tracks 74, and collects the abraded particles of carbon dust and other materials produced at the slide tracks before they reach the encapsulated optical transmission unit. For this, the electrostatic screen is preferably formed from electrically conducting material, or coated with at least one such material. Furthermore, this screen may be designed so that it is statically charged owing to the relative movement between the first and the second unit. Alternatively, it also may be supplied with charge from a high voltage source.

The invention claimed is:

1. Device for transmitting modulated optical signals between a first unit and a second unit, in which the second unit is supported to be rotatable or linearly movable relative to the first unit, comprising:

A light guide extending along a given circular or linear track of a predetermined length on the first unit;

At least one first light coupler connected to the light guide for coupling light into or out of the light guide;

At least one second light coupler disposed on the second unit and movable along the circular or linear track relative to the light guide, for coupling light into and out of the light guide;

A coupling slide of a short length compared with the predetermined length of the given track, for supporting the second light coupler, wherein the second unit is supported to be rotatable relative to the first unit, wherein the given track on the first unit is circular, wherein the at least one second light coupler is movable along the circular track relative to the light guide, wherein the at least one coupling slide is of a short length compared with a circumference of the circular track, and wherein the at least one coupling slide is connected to be moved by a take-up unit via a mechanical coupling that is loose along at least one axis;

A guide means disposed along the track for guiding the coupling slide; and

Wherein, said take-up unit connects the coupling slide with the second unit to move the coupling slide in a direction of movement of the second unit by a movement of the second unit.

2. Device according to claim 1, wherein the second unit is supported to be movable linearly relative to the first unit, wherein the given track on the first unit is linear, wherein the least one second light coupler is movable along the linear track relative to the light guide, wherein the at least one coupling slide is of a short length compared with a length of the linear track, and wherein the at least one coupling slide is connected to be moved by the take-up unit along at least one direction.

3. Device according to claim 1, wherein hydrostatic or hydrodynamic bearing means are provided for the coupling slide, so that the coupling slide is maintained in a defined position with respect to the light guide along at least one axis by means of a liquid or gaseous medium, or a bearing means based on a liquid or gaseous medium.

4. Device according to claim 3, wherein the coupling slide is maintained in a defined position with respect to the light guide along two axes perpendicular to a tangent of a rotary movement of the two units.

5. Device according to claim 3, wherein the gaseous medium is air.

6. Device according to claim 3, wherein at least one means for hydrostatic or hydrodynamic bearing of the coupling slide is supplied with an oscillating air current.

7. Device according to claim 1, wherein the coupling slide is supported optionally by means of ball bearings or slide bearings.

8. Device according to claim 1, wherein at least one coupling slide is provided with an actuator, at least one sensor associated therewith, and one control unit for adjusting a position of the light coupler, wherein at least one sensor is provided for determining the position of the light coupler and communicating signals to the control unit, and wherein the control unit generates corresponding control signals for the actuator, so that the position of the light coupler is maintained at a given value relative to the light guide along at least one axis.

9. Device according to claim 8, wherein the position of the light coupler is maintained at a given value relative to the light guide along two axes perpendicular to a tangent of a rotary movement of the two units.

10. Device according to claim 8, wherein at least one sensor is designed to be one of an optical, a capacitive, and an inductive sensor.

11. Device according to claim 10, wherein at least one sensor is designed to be a differential sensor.

12. Device according to claim 1, wherein the light guide is divided into at least two segments, wherein means are provided for optical isolation of the segments from each other, and wherein lengths of the segments, directions of propagation of light along the segments, and any leads to the segments are designed so that at boundaries between any two segments in which a same signal is transmitted, a modulation signal has only minor differences of transit time or phase that are small compared with a duration of a period of the modulation signal.

13. Device according to claim 12, wherein groups are provided which each consist of two adjacent segments having a same transit time and an opposite direction of propagation of light.

14. Device according to claim 12, wherein the means for optical isolation of the segments from each other are designed to be absorbing, or diffusely scattering to direct outwards light guided along the segments.

15. Device according to claim 12, wherein at least one means for optical isolation is designed to be wavelength selective.

16. Device according to claim 1, wherein at least one second light coupler comprises a light-guiding fiber with an end that has at least one face serving to deflect light guided in the light-guiding fiber at an angle at which the light can be carried through the light guide.

17. Device according to claim 16, wherein the light-guiding fiber is disposed to be approximately perpendicular to a tangent to the light guide, and wherein an angle of deflection of light issuing from the fiber extends approximately tangentially to the light guide.

18. Device according to claim 16, wherein the light-guiding fiber is designed to be also an optical sensor.

19. Device according to claim 18, wherein the light-guiding fiber, designed to be an optical sensor, comprises at least one further face for deflecting sensor signals along a direction of a contour of the light guide.

20. Device according to claim 18, wherein at least one face is designed for wavelength-selective deflection or wavelength-selective filtering of sensor signals.

21. Device according to claim 1, wherein at least one second light coupler is provided for coupling evanescent fields.

22. Device according to claim 21, wherein at least one second light coupler is designed to be a prism.

23. Device according to claim 1, wherein the light guide comprises at least one boundary face having reflecting properties.

24. Device according to claim 23, wherein the light guide comprises a material having a reflecting or reflectively coated surface.

25. Device according to claim 24, wherein the reflecting or reflectively coated surface optionally comprises one of a reflecting foil, a reflectively coated foil, and a metallic layer.

26. Device according to claim 25, wherein the metallic layer has been applied by one of galvanizing, chemical coating, and vacuum coating.

27. Device according to claim 24, wherein the surface comprises a multi-layer system capable of interference.

28. Device according to claim 23, wherein the surface comprises a protective layer.

29. Device according to claim 1, wherein the light guide is designed to guide a wave along a boundary layer adjacent to surrounding air, similarly to a film wave or surface wave.

30. Device according to claim 1, wherein the light guide comprises a surface-coated fiber.

31. Device according to claim 1, wherein the light guide comprises a tube coated on the outside or inside.

32. Device according to claim 1, wherein the light guide has converging properties in at least one plane.

33. Device according to claim 1, wherein the light guide is of a freely-selected shape along the direction of propagation of the light.

34. Device according to claim 33, wherein the light guide is of a polygonal shape or circular shape.

35. Device according to claim 1, wherein along a direction of propagation of light, the light guide consists of a polygon having a plurality of equal or different segments.

36. Device according to claim 35, wherein the segments have focusing or beam-shaping characteristics.

37. Device according to claim 1, wherein at least one light-guiding fiber is provided for supplying optical signals from the first unit and coupling the optical signals into the light guide.

38. Device according to claim 1, wherein for coupling optical signals from the first unit into the light guide, at least one lens of freely-selected shape is provided for optimal beam focusing.

39. Device according to claim 38, wherein the lens is designed simply to be a spherical or cylindrical lens.

40. Device according to claim 1, wherein at least one deflecting unit is provided for coupling optical signals from the first unit into the light guide.

41. Device according to claim 40, wherein the deflecting unit is one of a mirror, a prism, and a suitably shaped end of a light-guiding fiber.

42. Device according to claim 1, wherein the light guide comprises an optical grating for coupling out light.

43. Device according to claim 1, wherein the light guide comprises a structure for coupling out light.

44. Device according to claim 43, wherein the structure is a Fresnel structure.

45. Device according to claim 1, wherein optionally at least one optical transmitter or at least one optical receiver is designed to be also a light coupler.

46. Device according to claim 1, wherein means are provided for simultaneous transmission of a plurality of channels on different optical wavelengths.

47. Device according to claim 46, wherein a plurality of first light couplers which are provided for coupling-in or coupling-out respectively different wavelengths are disposed at different positions along the light guide.

48. Device according to claim 46, wherein at least one means for optical isolation is designed to be wavelength-selective.

49. Device according to claim 46, wherein a plurality of means for optical isolation, which are designed to be wavelength-selective, are disposed at suitable positions to isolate the segments of the light couplers for respective wavelengths.

50. Device according to claim 1, wherein at least one optical transmitter is provided for emitting polarized light having a polarization that can be coupled into the light guide and guided along the light guide with as low as possible an attenuation.

51. Device according to claim 1, wherein at least one polarization-selective optical receiver is provided for receiving light of a predetermined polarization.

52. Device according to claim 1, further comprising:
a plurality of optical transmitters for emitting polarized light;
a plurality of polarization-selective optical receivers; and
a plurality of groups of optical transmitters and receivers which are tuned to each and are formed for simultaneous transmission of a plurality of channels.

53. Device according to claim 1, wherein at least one optical transmitter is provided for emitting polarized light, wherein at least one polarization-selective optical receiver is provided, wherein polarization of the polarized light is modulated optionally in the optical transmitter itself or in a signal path, to encode a signal to be transmitted, and wherein the optical receiver compnses means for converting a modulation of polarization into a modulation of amplitude.

54. Device according to claim 1, wherein the light guide comprises a mechanical encapsulation for protecting the light guide from undesired mechanical influence, and in particular from contamination.

55. Device according to claim 54, wherein the encapsulation is sealed from surroundings by a labyrinth or a gap seal.

56. Device according to claim 55, wherein an encapsulation inner space in which the light guide is located is at a higher pressure than an outer side.

57. Device according to claim 54, wherein the encapsulation is sealed from surroundings by means of an abutting lip or a plastic foil.

58. Device according to claim 54, wherein an electrostatic screen is additionally provided for keeping away electrically charged or electrically chargeable particles from the light guide.

59. Device according to claim 54, wherein parts of the encapsulation or a receptacle of the light guide comprise a micro-surface.

* * * * *

UNITED STATES PATENT AND TRADEMARK OFFICE
CERTIFICATE OF CORRECTION

| | | |
|---|---|---|
| PATENT NO. | : 7,248,761 B2 | Page 1 of 1 |
| APPLICATION NO. | : 11/352979 | |
| DATED | : July 24, 2007 | |
| INVENTOR(S) | : Schilling et al. | |

It is certified that error appears in the above-identified patent and that said Letters Patent is hereby corrected as shown below:

IN THE CLAIMS:

Col. 21, line 14: please delete "compnses" and replace with --comprises--.

Signed and Sealed this

Eighteenth Day of September, 2007

JON W. DUDAS
*Director of the United States Patent and Trademark Office*